May 25, 1926.
J. PAISSEAU
1,586,462
SUPPORT SERVING AS CORE FOR BEADS DURING THEIR MANUFACTURE
Filed April 14, 1925
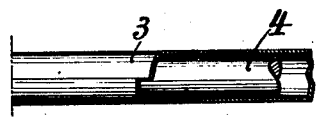
INVENTOR
JEAN PAISSEAU
BY
ATTORNEYS Patented May 25, 1926.

1,586,462

UNITED STATES PATENT OFFICE.

JEAN PAISSEAU, OF PARIS, FRANCE.

SUPPORT SERVING AS CORE FOR BEADS DURING THEIR MANUFACTURE.

Application filed April 14, 1925. Serial No. 23,095.

My invention relates to the supports serving as cores for beads made of glass or enamel, during the manufacture of the same.

In the manufacture of such beads it is the custom to employ as a support for the fused drop of substance, what is termed a hinge, that is to say a thin copper strip is rolled into a split tube. The support is formed in this manner for the reason that, on the one hand, the tubular shape and the thinness of the walls will offer a certain flexibility or compressibility in the radial direction, so that when cooling the drop may contract without cracking, and that, on the other hand, the said copper tube can be readily destroyed by chemical action, for example by dissolving it in an acid, so as to separate it from the finished beads.

However this kind of hinge has but little resistance to mechanical actions, and are only available when the rotation is effected by hand. It cannot be employed in the mechanical manufacture of the beads, because the hinge is then subjected to relatively great efforts of tension as well as torsion. For the purpose of allowing such mechanical manufacture, it has been proposed to employ as a support or hinge a solid metallic wire covered with a suitable layer allowing the easy removal of the beads, but such a support is not capable of yielding to radial pressure and causes crackings of the beads.

My invention has for its object to produce supports which are also capable of yielding to the radial pressures produced by the contraction of the drops of glass or enamel and will withstand the stresses due to the mechanical manufacture, allowing to use the old hinge made of an easily destroyable metal.

The accompanying drawing shows by way of example an embodiment of a support made according to my invention, the same being in elevation and partly in section.

In the drawing a usual tubular hinge 3 made of thin copper or brass is combined with a solid wire 4 which is disposed loosely within the said tubular element or hinge, and has a sufficient resistance to support the usual mechanical stresses. The very slight play between the wire and the tube is sufficient to preserve to the latter the required flexibility.

Upon completion of the beads, the said wire may be readily withdrawn and the tubular element can be destroyed in the known manner. Instead of a metallic wire 4, a thread of asbestos or like substance which will withstand the action of fire and of mechanical stresses may be employed; instead of an ordinary hinge 3 it is possible to use a thin copper sheet or a sheet or strip of copper suitably wound upon the said wire.

Instead of making the tube 3 of copper or brass, the same can be made of a metal or alloy which will withstand mechanical stresses and at the same time capable of being easily destroyed, such as for example a copper-nickel, copper-vanadium, copper-silicon or like alloy.

Having thus described my process and apparatus, what I claim as new therein, and my own invention, is:

1. A support serving as a core for beads made of glass or enamel during their manufacture, consisting of a tubular element of small thickness which will readily yield to radial compression stresses due to the contraction of said beads when cooling and capable of being dissolved in a suitable liquid, and a member disposed in a removable manner within the said tubular element, the removable member being adapted to withstand the stresses of mechanical manufacture.

2. A support serving as a core for beads made of glass or enamel during their manufacture, comprising a split tube and a solid wire disposed within said tube with a slight play, said wire being removable from the tube after the contraction of the said beads upon the said tube.

In testimony whereof I have hereunto affixed my signature.

JEAN PAISSEAU.